PHASE AND FREQUENCY MODIFYING APPARATUS FOR ELECTRICAL WAVES

Filed Nov. 28, 1956 2 Sheets-Sheet 1

INVENTOR.
ROBERT F. MORRISON JR.
BY
Darby + Darby
ATTORNEYS

PHASE AND FREQUENCY MODIFYING APPARATUS FOR ELECTRICAL WAVES

Filed Nov. 28, 1956 2 Sheets-Sheet 2

INVENTOR.
ROBERT F. MORRISON JR.
BY
Darby + Darby
ATTORNEYS

United States Patent Office 2,908,813

Patented Oct. 13, 1959

2,908,813

PHASE AND FREQUENCY MODIFYING APPARATUS FOR ELECTRICAL WAVES

Robert F. Morrison, Jr., Washington, D.C., assignor to Emerson Radio & Phonograph Corporation, Jersey City, N.J., a corporation of New York Application November 28, 1956, Serial No. 624,763

14 Claims. (Cl. 250—20)

The present invention relates to frequency-shifting apparatus and more particularly to such apparatus which produce a frequency shift by continuous step-wise phase-shifting.

Several methods of shifting the frequency of an electrical signal are known. One common method consists of combining or mixing a second signal with a signal to be modulated to produce signals having frequencies equal to the sum and difference of the two input signal frequencies and then selecting one of the sum or difference frequencies for the output signal by means of filters, or the like. Variations of this method are used, for example, to produce intermediate frequencies in superheterodyne radio receivers and in many other applications.

The mixer method of producing a frequency shift in a signal requires the mixing of two signals by more or less complex apparatus and results in the production of a number of signals of different frequency from which the desired signal must be separated. This is not desirable in many cases, particularly where the signal of desired frequency is small in magnitude or the frequency shift is small and hence the desired frequency and undesired frequencies are somewhat difficult to separate.

The present invention provides a device which produces a frequency shift in an input signal by effecting continuous step-wise phase shifts in the signal to be shifted, and is particularly adapted to microwave signals. The present invention is particularly useful in systems of the general type discussed in copending patent application Serial No. 614,491 for "Self-Correlated Frequency-Modulation Continuous Wave Distance Measuring Systems," filed October 8, 1956, in the name of Harold Goldberg, and constitutes an improvement over the frequency shifter disclosed and claimed therein.

The frequency-shifter shown and described herein is designed to operate at microwave frequencies (i.e. frequencies at which waveguide techniques are practical), and it will be noted that the present invention overcomes disadvantages of previously known shifting methods which are particularly serious at microwave frequencies.

It is accordingly an object of the present invention to provide apparatus for controllably shifting the frequency of a signal wherein the input signal is shifted in frequency by producing continuous step-wise shifts in phase of the signal.

It is another object of the present invention to provide a device for shifting the phase of a microwave signal by fixed increments in response to an electrical signal.

It is a further object of the present invention to provide a microwave phase-shift apparatus wherein a microwave signal to be modulated traverses a path which may be effectively changed in length by activation of microwave switching devices thereby shifting the phase of the output signal.

It is a still further object of the present invention to provide a microwave device for shifting the frequency of the microwave signal which is of particularly simple construction and provides reliable operation.

Other objects and advantages of the present invention will be apparent from a consideration of the following description in conjunction with the appended drawings, in which.

Figure 1:
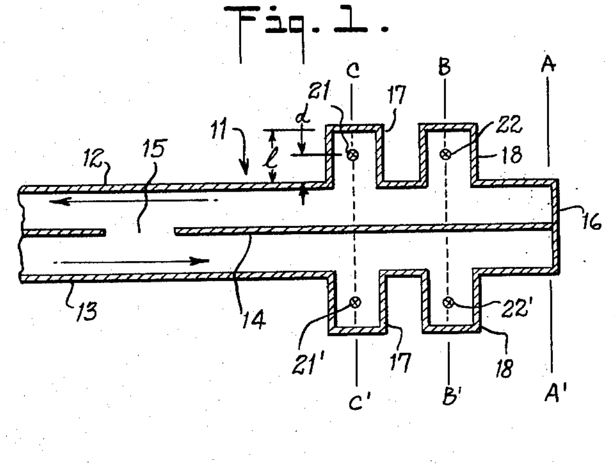
Fig. 1 is a top plan sectional and partially schematic view of a microwave frequency-shifting device according to the present invention.

Referring to the drawings and particularly to Fig. 1, a mircowave frequency-shifter is shown at 11. It comprises two rectangular waveguides 12 and 13 having a common wall 14 which has an aperture or slot 15 providing communication and microwave coupling between the waveguide 12 and waveguide 13. The waveguides 12, 13 and slot 15 are arranged as a directional coupler, a preferred form of which is disclosed in greater detail in U.S. Patent No. 2,739,287 to H. J. Riblet. The ends of the waveguides 12 and 13 are closed by an end wall 16. The plane of the end wall 16 is indicated by the line AA'.

The waveguide 12 is provided with extending waveguide arms 17 and 18. Similar arms 17' and 18' are provided for the waveguide 13. The arms 17, 17', 18 and 18' are of such a length and configuration relative to the frequency of the signal to be transmitted in the waveguide that the transmission of a microwave signal through the waveguide sections 12 and 13 to the end wall 16 is normally not impeded by the presence of the arms 17, 17', 18 and 18'. The junctions so formed between the arms 17, 17', 18, 18' and the main waveguides 12, 13 can be in the E-plane or H-plane. The H-plane type of junction is shown in Fig. 1, with the wide dimension of the rectangular waveguide in the plane of the drawing and the short dimension extending in a direction perpendicular to that plane. The H-plane configuration of Fig. 1 will be explained for the purpose of illustration. For such H-plane junctions, in the arms 17, 17', 18, 18', the short circuit formed by the end wall is spaced approximately one-half wave length from the junction for the desired effect. The center plane of the arms 17 and 17' is indicated in Fig. 1 by the line CC' and the center plane of the waveguide arms 18 and 18' is indicated by the line BB'. Located within the waveguide arm 17 there is a shunt crystal 21 connected as a microwave switching element whose operation is described below. Arms 17', 18 and 18' are similarly provided with crystals 21, 22 and 22' respectively.

Figure 2:
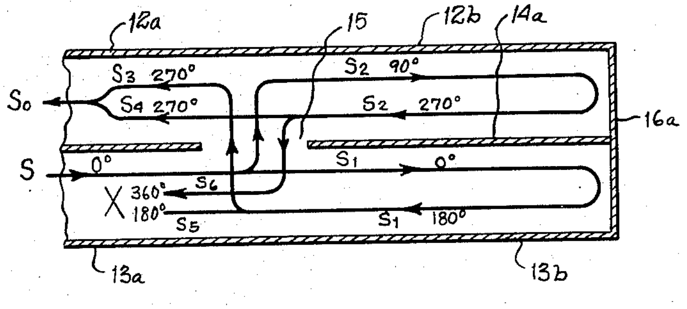
Fig. 2 is a schematic diagram of a form of hybrid junction showing the phase relationships of input and output signals and useful in explaining the operation of the device shown in Fig. 1.

The operation of the present device may best be explained by first referring to Fig. 2. Fig. 2 shows a simplified diagram of the device of Fig. 1 without the waveguide arms for the purpose of explaining the operation of the adjacent waveguides 12 and 13 with an aperture 15 as a directional coupler device. The operation of the device of Fig. 1 will therefore be explained first with reference to Fig. 2, ignoring, for the time being, the effect of the waveguide arms 17, 17', 18 and 18' and the crystals located therein.

In the device shown in Fig. 2 a signal introduced into one of the waveguide sections **12*a* or 13*a* divides into two substantially equal portions upon passing the aperture 15, one portion proceeding along the original waveguide and the other passing through the aperture 15 and then along the other waveguide, in the same direction. The portion of the signal passing through the aperture 15** also experiences a phase shift (lag) of 90°.

The phase shifting effect of the aperture 15 is indicated in Fig. 2 where a signal S is shown entering the waveguide section **13*a* and splitting into two parts $S_1$ and $S_2$; $S_1$ continues down the waveguide section 13*b* (to the right in Fig. 2) while $S_2$ splits off and passes through aperture 15 and down the waveguide section 12*b*. If the phase angle of the input signal S is arbitrarily considered to be 0° then the signal $S_1$ after passing by the aperture 15 (and ignoring phase shifts due to wave travel time) will have a phase angle of 0° also since the phase of the signal $S_1$ remaining in guide 13 is not altered by the presence of the aperture 15. The signal $S_2$, however, experiences a phase shift of 90° in passing through the aperture 15. The phase shift experienced in passing through aperture 15** will arbitrarily be considered to be positive to simplify the explanation of the operation of the modulator.

Continuing with the path of $S_1$, it will be noted that $S_1$ is reflected from the end wall **16*a* and thereby experiences a 180° phase shift. The signal $S_1$ then returns up the waveguide to aperture 15 (to the left in Fig. 2) without further shift in phase. At the aperture 15, however, the signal $S_1$ is split into two parts $S_3$ and $S_5$. The signal $S_3$ passes through the aperture 15 into the waveguide section 12*a* while the signal $S_5$ continues up the waveguide section 13*a*. The signal $S_5$ experiences no phase shift in passing by the aperture 15. However, the signal $S_3$ in passing through the aperture 15 into the waveguide 12*a* is shifted in phase by 90°. The phase of the signal $S_3$ then becomes 270° and it continues up the waveguide 12*a***.

Considering now the further progress of the signal $S_2$, the signal $S_2$ is reflected at the end wall **16*a* and is shifted in phase by 180°. After reflection from the end wall the phase of the signal $S_2$ is therefore 270°. The signal $S_2$ continues back up the waveguide section 13*b* to the aperture 15 where it is split into two signals. The signal $S_6$ passes through the aperture 15 back into the waveguide 13*a* while the signal $S_4$ continues up the waveguide 12*a***.

The signal $S_4$ has a phase of 270° as does the signal $S_3$ also passing up the waveguide **12*a***. Thus the signals $S_3$ and $S_4$ reinforce one another and the two signals are effectively added to produce a resultant output signal $S_0$.

In passing through the aperture 15 back into the waveguide **13*a*, the signal $S_6$ is once again shifted in phase by 90°. Thus the phase of the signal $S_6$ passing up the waveguide 13*a* is 360°. The signal $S_6$ is therefore 180° out of phase with the signal $S_5$. Each of the signals $S_5$ and $S_6$ is the result of two successive divisions of the original input signal S. Since the aperture 15 divides a signal into two substantially equal parts, it then follows that the signal $S_6$ and the signal $S_5$ will be substantially equal in amplitude. Hence the signals $S_5$ and $S_6$ being substantially equal and 180° out of phase, will cancel and therefore little or no signal will be transmitted back out of waveguide 13*a***.

From the foregoing explanation it will be seen that when a signal S is introduced into the waveguide section **13*a* it will enter the waveguide sections 12*b* and 13*b* and will be reflected from the end wall 16*a* and transmitted out through the waveguide 12*a*. No signal will be reflected back up the waveguide 13*a*** due to the cancellation of oppositely phased signals $S_5$ and $S_6$ in the manner explained above. In practice the phase shifts and signal divisions will not be exactly as described and thus the device will only approach the theoretical mode of operation described above. For practical purposes, however, the operation of the device is substantially as described. It will be noted that the path lengths travelled by the various signal components from the input to the output are all equal, so that phase shifts due merely to travel time of the respective wave components may be ignored here.

Referring again to Fig. 1 it will be seen that the device of Fig. 1 consists essentially of a directional coupler with an end wall 16, the operation of which was described with reference to Fig. 2, and a number of waveguide arms extending from each of the waveguides 12 and 13. As previously explained, the waveguide arms 17, 17', 18 and 18' are of such a length and configuration that they ordinarily have substantially no effect on the transmission of a microwave signal through the waveguide sections 12 and 13. In effect, each arm (for an H-plane junction) has a low series impedance at its junction with the wall of its main guide. By itself, it therefore has no effect on the flow of energy in the main guide. Placed within the waveguide arms 17, 17', 18 and 18' are crystals 21, 21', 22 and 22' respectively. The crystals 21, 21', 22, and 22' are located and electrically connected so that an effective short circuit may be created across each of the waveguide arms at the location of the crystal by supplying an appropriate electrical signal to the crystal. The crystal in the absence of such a signal has a high effective impedance which, due to the location of the crystal in its arm, has no substantial effect upon the system. However, the application of the signal to the crystal changes its impedance to a very low value. The use of crystals as microwave shorting devices is well known in the art and these known techniques are, of course, directly applicable here.

The crystals 21, 21', 22 and 22' produce an effective shortening of the lengths of their respective arms 17, 17', 18 and 18' when they are activated by an appropriate signal. When an arm such as 17 is effectively shortened by the activation of the crystal 21, the arm 17 then produces a definite effect on signals transmitted through the waveguide 12. The location of the crystal 21 in the arm 17 is chosen so that activation of the crystal will effectively produce a zero impedance across the waveguide 12 along the line CC'. This has the same effect as producing a high impedance in the wall of the guide 12. In other words, activation of the crystal 21 will produce a reflection point along the line CC' so that microwave signals which were previously reflected from the end wall 16 (at the line AA' in Fig. 1) will now substantially be reflected at the line CC'.

The other crystals 21', 22 and 22' are also located in their respective arms 17, 18 and 18' so that activation of a particular crystal produces a signal reflection at the center plane of that particular arm of the device.

As one example of suitable dimensions for the waveguide arms 17, 17', 18 and 18', the waveguide arms may be constructed so that the effective length $l$ of each arm is ½ of a wave length. An arm of such length will produce substantially no effect within the waveguides 12 and 13, and the transmission of a signal through the waveguides 12 and 13 will be substantially as if the arms 17, 17', 18 and 18' were not present.

The crystals 21, 21', 22 and 22' may be located at a point which is effectively ¼ of a wavelength from the outer end of the arm. Thus when the crystal is activated to produce a short circuit at the location of the crystal, the waveguide arm is then effectively shortened to a length of ¼ of a wavelength. A shorted arm of ¼ wavelength (for an H-plane junction) creates a very low impedance across a waveguide such as 12 or 13. Thus when constructed with the foregoing dimensions or equivalents thereof, the activation of any one of the crystals 21, 21′, 22 or 22′ creates a reflection point in the respective waveguide section 12 or 13 at the center plane of the arm containing the crystal.

It will be understood that the dimensions in terms of wavelengths given above refer to wavelengths in the waveguide rather than free space wavelengths. In addition certain adjustments must be made for end-effects and for the widths of the waveguide sections. Exemplary dimensions for the physical length $l$ of the arm 17 and for the physical distance $d$ between the location of the crystal 21 and the outer wall of the waveguide 12 are as follows:

Where $\lambda_g$ is the wavelength in the waveguide in the signal to be modulated then:

(1) $$l=.58\lambda_g$$

(2) $$d=.36\lambda_g$$

It will be understood that in accordance with well-known practice in the microwave art the lengths of the arms 17, 17′, 18 and 18′ may of course be made longer by multiples of a ½ wavelength without materially changing the operation of the devices. Although a particular method of utilizing a crystal as a switch for microwave signals has been described, other known methods may equally well be used. For example, it is obvious that the crystals may be placed directly within the waveguides 12 and 13 in order to provide controllable reflection points. It is thought, however, that the apparatus shown, incorporating a microwave switching arrangement in side arms, is preferable in most instances.

A crystal is utilized as a switching element in the device of Fig. 1 as it provides a particularly simple and effective switching device for low level microwave signals. The invention is not limited to the use of a crystal however and other switching devices such as gas tubes or ferromagnetic devices could be used if desired.

When the device of Fig. 1 is operated to provide a frequency shift, the crystals 21 and 21′ are connected in parallel or otherwise arranged to operate in conjunction. The same is true of crystals 22 and 22′. Thus when none of the crystals 21, 21′, 22 and 22′ is activated, the signals in the waveguides 12 and 13 are reflected at the line A—A′ by the end wall 16 of the waveguides. When the pair of crystals 22 and 22′ is activated, the signals in the waveguides 12 and 13 are then reflected at the line B—B′ by virtue of the switching effect of the crystals and the waveguide configuration. The effective length of the waveguides 12 and 13 may therefore be shortened to the line B—B′ or to the line C—C′ by the controlled activation of crystals 22 and 22′ or 21 and 21′ respectively.

The distance between the line A—A′ and the line B—B′ is preferably chosen to be ⅙ of the wavelength in the waveguide of the signal to be frequency-shifted. Activating the crystals 22 and 22′ therefore causes a shortening of the path for the microwave signal in the device which is equal to twice this distance or ⅓ of the wavelength in the waveguide of the signal to be modulated.

When the effective path length within the modulator is shortened by ⅓ of a wavelength, a substantially instantaneous shift in phase of 120° is produced at the left end of the output waveguide 12. Shortening of the path length causes a positive shift (advance) in phase while a lengthening of the path causes a negative shift (lag) in phase.

In operation as a frequency converter, control signals are supplied to the crystals 21, 21′, 22 and 22′ so that the reflection point in the waveguide is sequentially shifted from A to B to C back to A, etc. Shifting of the reflection point in this manner causes a sequential shift in phase as may be observed by reference to Fig. 3.

Figure 3:
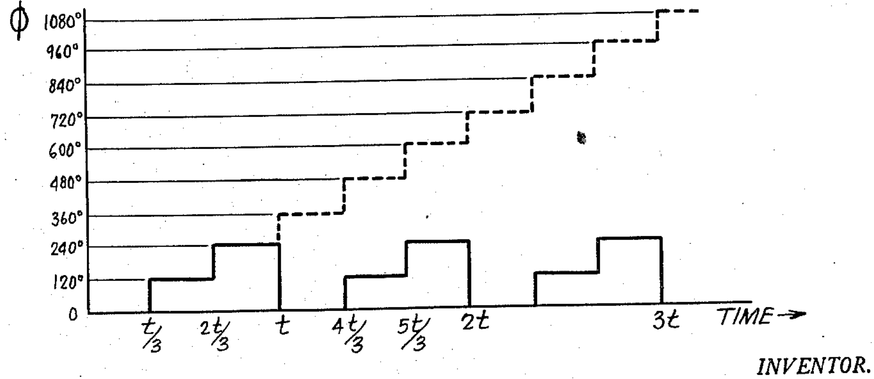
Fig. 3 is a graph of phase shift relative to elapsed time showing the manner in which the sequential phase-shift of the present device produces an effective shift in frequency.

In Fig. 3 the phase of the output signal is represented on the vertical axis while time is represented on the horizontal axis. At the time 0 it is assumed that the crystals 21, 21′, 22 and 22′ are not activated and therefore the signal to be modulated is reflected from the end wall 16 along the line A—A′. A signal of given phase will then be produced at the left end of the output waveguide 12. The phase of this signal is arbitrarily assigned the value of 0°. At a time $$\frac{t_1}{3}$$

crystals 22 and 22′ are activated, thereby causing a signal in the modulator 11 to be reflected at the line B—B′. The path length for the signal within the modulator is thereby shortened by ⅓ of a wavelength and the phase of the signal at the left end of the output waveguide 12 is advanced by 120°.

At time $$\frac{2t}{3}$$

the crystals 21 and 21′ are actuated so that a further shortening of the signal path length is produced and a further advance in phase of 120° is produced upon the signal at the left end of the output waveguide 12. It is immaterial whether crystals 22, 22′ are activated during this interval. At time $t$ all four crystals are deactivated thus returning the modulator to the condition existing at time 0 and completing the crystal control signal cycle. At the time $t$ the phase of the signal at the left end of the output waveguide 12 returns to 0°. However, since all cycles of the input signal are identical, there is no distinction between a shift in phase of 360° and 0° phase shift. Thus returning the output signal at the left end of the wave guide 12 to 0° phase shift is the equivalent of producing a 360° phase shift. This is indicated by the dotted line in Fig. 3.

At a time $$\frac{4t}{3}$$

the reflection point is again moved to the line B—B′ and an additional positive phase shift is imposed on the signal at the left end of the output waveguide 12. While the actual total phase shift is again 120°, this is the equivalent of a phase shift of 360° plus 120° or 480°. This is again indicated by the dotted line in Fig. 3.

Further repetitions of the control signal cycle are represented in Fig. 3 and it will be observed that the sequential shifting of phase produced by the device produces continual and uniform sequential shift in phase.

The effect of the continual phase shift may be analyzed as follows:

Let $$S=\sin(\omega t+\phi_0) \tag{3}$$

where:

S is the instantaneous input signal voltage
$t$ is time
$\omega$ is the frequency expressed in radians per second and
$\phi_0$ is the input phase angle.

If $f$ is the frequency of the above signal in c.p.s. then $$f=\omega/2\pi \tag{4}$$

In the case of the device of Fig. 1 the output phase is being continually shifted so that $$\phi=\phi_0+\Delta\phi \tag{5}$$

where $\phi$ is the instantaneous apparent output phase, and $\Delta\phi$ is the shift imparted by the device. In the case where the device is performing a simple frequency conversion, the phase shift is directly related to the elapsed time.

Assuming that the phase shift is continuous rather than sequential for the moment:

$$\Delta\phi = kt \quad (6)$$

where $$k = \frac{dt\phi}{dt} \text{ (rdn. per sec.)}$$

Substituting (5) in (3)

$$S_0 = \sin(\omega t + \phi_0 + \Delta\phi) \quad (7)$$

and substituting (6)

$$S_0 = \sin(\omega t + kt + \phi_0) \quad (8)$$
$$S_0 = \sin([\omega + k]t + \phi_0) \quad (9)$$

From (3), (4) and (9) it may be seen that the effective frequency of the output of the modulator is $$f_1 = (\omega + k)/2\pi \quad (10)$$
$$f_1 = f + k/2\pi \quad (11)$$

$k/2\pi$ is the rate of change of phase expressed in cycles per second and is equal to the frequency of the cycle of crystal control. The output frequency is therefore shifted by an amount equal to the crystal control cyclic frequency.

As a matter of fact the phase shift is sequential or step-wise rather than continuous, and as a result the output signal will not be a pure sine wave shifted in frequency but will contain some components of other frequencies as well as the desired frequency.

In effect, the crystal switching produces a type of amplitude modulation of the input signal. However, when each cycle of phase shifts adds up to substantially 360° or a multiple thereof, it can be shown that the usual sidebands are not equal in amplitude; rather, one sideband is substantially zero, the input frequency component is very small and the other sideband is relatively large. The effect is generally equivalent to a single-sideband modulator with the additional effect of substantially suppressing the carrier to have only one sideband displaced in frequency from the input signal (carrier). In normal use, the presence of these other frequencies is immaterial or may readily be removed by filtering or otherwise.

Figure 4:
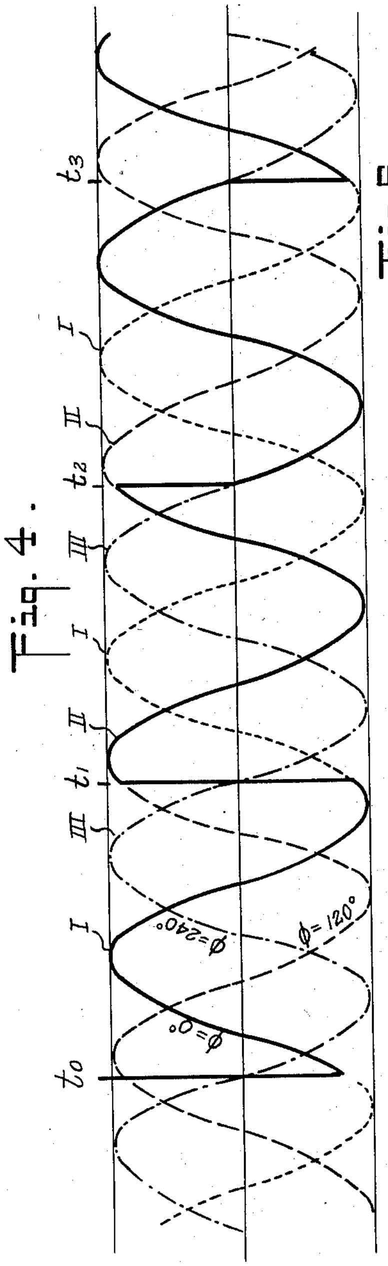
Fig. 4 is a diagram of a sinusoidal input signal to be frequency-shifted and the output signal produced by sequential phase shifts produced according to the present invention.

A comparison of the results of a continuous shift in phase analyzed above and the sequential step-wise shift in phase actually produced by the device will be understood by reference to Fig. 4. In Fig. 4 three signals I, II and III having a sinusoidal waveform are shown. Each of these signals is displaced from the other by 120°. The first signal I is represented by a dotted line, the second signal II is represented by a dashed line and the third signal III is represented by a dot-dash line. Each of these three signals represents the output of the device 11 when it is in a respective one of its three possible conditions, namely with the signal reflection point at the line A—A′ at the line B—B′ or at the line C—C′.

The heavy solid line superimposed on various portions of the non-solid lines in Fig. 4 represents the output of the device 11 as produced when the reflection point in the modulator is sequentially shifted by a control signal. Starting at the time $T=t_0$ the output signal has a phase which will arbitrarily be given the value of 0°. The output signal then is that with the reflection point at the line A—A′, or signal I. At some instant of time indicated by $t_1$ in Fig. 4 the reflection point in the device is shifted to the line B—B′, and a positive phase shift of 120° is produced in the output signal. In Fig. 4 this is shown by a substantially instantaneous shift of the heavy solid line from the dotted signal I to the dashed signal II. The dashed signal II leads the dotted line signal I by 120° and represents the output signal when the reflection point is at the line B—B′ in Fig. 1.

The solid line in Fig. 4 coincides with the dashed line II until some point in time indicated by the reference character $t_2$. At this time the reflection point of the device 11 in Fig. 1 is changed from the line B—B′ to the line C—C′ and therefore a substantially instantaneous positive phase shift from 120° to 240° is produced in the output signal. This is represented in Fig. 4 by a substantially instantaneous shift of the solid line from the dashed line II to the dot-dash line III, representing the output signal from the modulator when the reflection point is at the line C—C′.

At a point in time indicated by the character $t_3$ in Fig. 4 the cycle is completed by shifting the reflection point back to the point A—A′, thereby producing a shift in phase which, though actually equal to a negative shift of 240°, is effectively equivalent to a positive shift of 120°. This fact is demonstrated in Fig. 4 where the solid line substantially instantaneously shifts from dot-dash line III to the dotted line I. The cycle will of course be continuously repeated as indicated in Fig. 4. While in this figure only a few cycles have been shown between times $t_1$, $t_2$ and $t_3$, it will be understood that many hundreds or thousands of cycles may occur in those intervals.

It is apparent from Fig. 4 that the output will vary from a pure sinusoidal waveform of the input frequency, and actually a strong component of the shifted frequency will appear in output signal.

In addition to the fact that the frequency change imparted to the input signal may be a greater or lesser percentage of the input frequency, it will also be obvious that the device is not limited to producing an increase or positive change in frequency but also may be utilized to produce a decrease or negative change in frequency. This may be accomplished by controlling the crystals in the modulator to shift the reflection point in the reverse order to that described above. In other words the reflection point may be sequentially shifted from C—C′ to B—B′ to A—A′ to C—C′, etc.

The device of course is not limited to but three reflection points. A greater number of reflection points may be provided with correspondingly lesser phase differences between reflection points. For example, 20 crystals and ten reflection points could be provided with a phase shift from one reflection point to another of 36°. Preferably the progressive phase shift between successive conditions of the crystals is equal to 360° (or a multiple of it) divided by the number of reflection points, although this need not be exactly the case.

Where there are more than three reflection points the distance between arms is less than $$\frac{\lambda_g}{6}$$

In such a case or even in a device with only three reflection points it may be desired to provide a greater separation between arms. This may be done by increasing the distance between arms by ½ wavelength or a multiple thereof. Increasing the distance between arms by ½ wavelength provides an increase in the change of path length between reflection points of a full wavelength and thus provides an equivalent path length so that the operation remains substantially unchanged.

Figure 6:
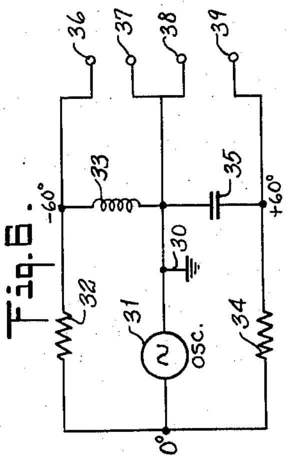
Fig. 6 shows an electrical circuit for producing signals of proper phase relationship to be applied to the switching elements of the device shown in Fig. 1.
Figure 5:
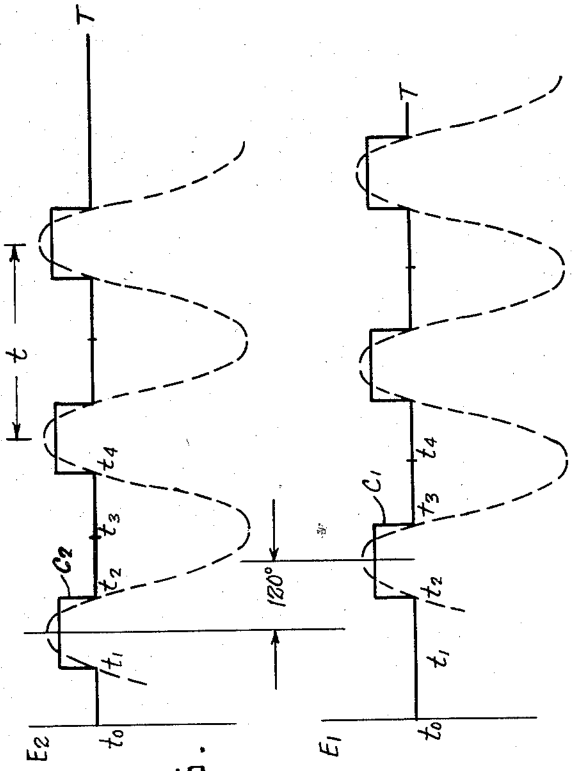
Fig. 5 is a diagram of the control signal voltage supplied to the crystals of the microwave device of Fig. 1, useful to show the manner in which the switching elements of the device may be controlled to produce a desired frequency shift.

A suitable control signal and means for providing it are shown in Figs. 5 and 6. The necessary conditions for the operation of the device in the manner explained above are that for a certain first fixed period of time none of the crystals are activated, so that the reflection point in the modulator will be at the wall 16. For a second fixed period of time the crystals 22 and 22′ must be activated while the crystals 21 and 21′ are not activated, and for a third fixed period of time the crystals 21 and 21′ must be activated at which time the crystals 22 and 22′ may or may not be activated. Control signals to the crystals 21, 21′, 22, and 22′, which satisfy this condition are shown in Fig. 5. The control signal $C_1$ in Fig. 5 is supplied to the crystals 21 and 21′ while the signal $C_2$ is supplied to crystals 22 and 22′.

It will be seen in Fig. 5 that during a first fixed period of time, $t_0$ to $t_1$, none of the crystals is supplied with a control signal, during a second period of time, $t_1$ to $t_2$, only the crystals 22 and 22' are supplied with control signal, and during a third period of time, $t_2$ to $t_3$, only the crystals 21 and 21' are supplied with a control signal. This cycle will of course be continuously repeated. The control signal to supply the crystals has been shown as simply a positive signal in Fig. 5. It will be understood however that it may be desired to bias the crystals with a constant voltage and to supply a control signal to overcome this bias in order to activate the crystals.

The actual magnitude of the control signal applied to the crystals is not particularly critical and therefore it is not necessary to supply a square pulse to activate the crystals shown in solid lines in Fig. 5. Rather than a square pulse control signal, a sinusoidal signal may be utilized as shown in dotted lines in Fig. 5. In such case it may be necessary to bias the sinusoidal control signal so that each crystal is activated for only ⅓ of the sine wave cycle. The manner in which the sine wave could be biased to provide a control signal to activate each crystal at a given third of the cycle is shown in dotted lines in Fig. 5.

If a sine wave control signal is used as shown in Fig. 5, then the control signals consist simply of two sinusoidal signals displaced in phase by 120°. Such signals are very readily generated, for example by the circuit shown in Fig. 6. An oscillator or other sine wave generator is shown at 31 in Fig. 6. A resistor 32 and an inductance 33 are connected in series with the oscillator 31 to provide an inductive circuit. A second resistor 34 and a capacitor 35 are connected in series with oscillator 31 to provide a capacitive circuit. The resistance and inductance values of the resistor 32 and the inductance 33 are selected so that the voltage across the inductance 33 will be 60° out of phase with the voltage produced by the oscillator 31. The values of resistance and capacitance of the resistor 34 and the capacitor 35 are likewise selected to provide a 60° phase difference in the voltage across the capacitor 35 with respect to the voltage produced by the oscillator 31.

The voltage across the inductance 33 lags the oscillator voltage while the voltage across the capacitor 35 leads the oscillator voltage and therefore a phase difference of 120° exists between the inductance voltage and the capacitance voltage. Thus control voltages having a 120° phase difference are available across the terminals 36 and 37 and across the terminals 38 and 39 respectively.

Each pair of crystals of the modulator 11 may be connected to a respective set of terminals 36—37 and 38—39 to provide control signals to the crystals having relative phases differing by 120°. Of course a constant bias may also be provided for the crystals as may be desired.

Figure 7:
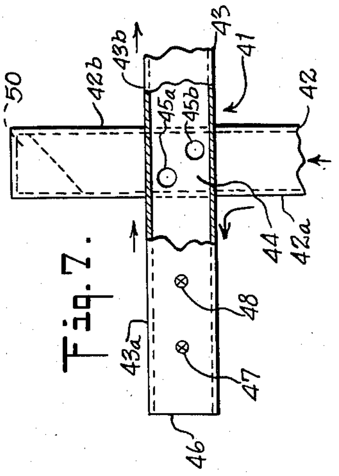
Fig. 7 is a plan view partly in section of an alternative construction of the microwave device utilizing a crossed waveguide directional coupler rather than a slot-type hybrid junction as in Fig. 1.

The present invention is not limited to devices utilizing a slot type hybrid junction as shown in Fig. 1 and in fact many types of hybrid junction or directional coupler may be utilized in the present invention. An alternative device utilizing a crossed-waveguide directional coupler 41 is shown in Fig. 7. The crossed-waveguide type coupler 41 shown in Fig. 7 comprises a first waveguide 42 and a second waveguide 43 at right angles thereto. The waveguide 42 and the waveguide 43 have a common wall 44 where they adjoin.

In the common wall 44 are two apertures **45*a* and 45*b*. The apertures 45*a* and 45*b* are staggered so that their common center line is at an angle of 45° to each of the waveguides 42 and 43**.

The lower section **42*a* of the waveguide 42 is the input to the crossed waveguide coupler 41. The upper section 42*b* of the waveguide 42 contains an attenuator 50 to substantially absorb all the microwave energy entering the waveguide section 42*b*** and to prevent any reflection from this section.

The operation of the crossed-waveguide apparatus as shown in Fig. 7 is well-known in the art. When a signal is introduced into the input waveguide section **42*a* it divides at the location of the apertures 45*a* and 45*b*. Part of the signal passes into the waveguide 43 while the other part continues into the waveguide section 42*b*, where it is absorbed. The part of the signal passing into the waveguide 43 passes entirely to the left into the waveguide section 43*a*. Substantially none of the input signal passes directly to the right into the waveguide section 43*b*, due to an anti-phase cancellation produced by the location of the apertures 45*a* and 45*b*. This feature of the operation of the crossed-waveguide directional coupler is well known and will not be discussed at length here. The waveguide section 43*a* is provided with an end wall 46. Also in the waveguide section 43*a* are mounted two crystals 47 and 48 spaced from the end wall 46 and from each other. The spacing of the crystals 47 and 48 from each other and from the end wall 46** is ⅙ wavelength (in the waveguide) as was the case in the first embodiment of the modulator discussed above.

Three reflection points are therefore provided in the waveguide section **43*a*, a fixed reflection point at the end wall 46 and two electrically controllable reflection points at the location of the crystals 47 and 48. When the crystals 47 and 48 are not activated the input signal is reflected from the end wall 46 and returns to the right through the waveguide section 43*a*. The signal divides at the apertures 45*a* and 45*b* and part of the signal continues to the right through the output waveguide section 43*b***.

If the crystal 47 or the crystal 48 is activated the path length of the signal in the modulator 41 will be shortened due to the reflection of the signal at the crystal 47 or at the crystal 48. The operation of this device 41 then is directly comparable to that of the device 11 previously described.

The device 41 may of course be provided with arms extending from the waveguide section **43*a* similar to the arms 17, 17', 18 and 18' above the modulator 11. In addition other modifications which are applicable to the first embodiment of the device 11 are similarly applicable to the crossed-waveguide device 41**.

It will be apparent to those skilled in the art that other types of directional couplers such as "magic T junctions" and the like may be substituted to provide other equivalent embodiments of frequency shifter according to the present invention. Waveguide structures are not essential since equivalent devices utilizing coaxial or parallel transmission lines may be used embodying the same principles described above.

It is obvious that the present invention may be utilized to produce a signal of varying frequency as well as to simply produce a constant frequency shift. In such a case the frequency of the control signal to the various crystals would be varied so that the shift in frequency would be varied and hence the output signal would have a varying frequency.

On the other hand a device according to the present invention may also be utilized to produce controllable phase shifts in a microwave signal which are not necessarily sequential as in the foregoing illustrations.

Although the production of a frequency shift by sequential phase shifts has been explained with reference to microwave devices, this invention is similarly applicable to lower frequency signals in which the phase shifting is produced by other than microwave techniques in any of many well-known manners.

Other modifications may be made within the scope of the present invention, and thus the invention is not to be construed to be limited to the particular embodiments shown but rather is limited solely by the appended claims.

What is claimed is:

1. A microwave frequency signal conversion device comprising at least three waveguide sections, means for coupling said three waveguide sections to transmit an input signal at the first of said sections to the second of said sections and not to the third of said sections and further to transmit a signal from the second of said sections to the third of said sections, means for electrically controllably causing a signal from the first of said sections to be reflected back into said second section from one of a plurality of fixed spaced reflection points and means for supplying an electrical control signal to the latter means to cause said input signal to be reflected at a selected one of said reflection points, whereby one of several predetermined degrees of phase shift may be imparted to a signal entering said second section and emitted at said third section by causing said signal to be reflected at a selected one of said spaced points.

2. A device as in claim 1 further comprising means for sequentially and cyclically activating said reflection points to cause a sequential step-wise phase shift of said input signal.

3. A signal conversion device as claimed in claim 1 wherein said means for coupling said waveguide sections is a slot-type hybrid junction.

4. A signal conversion device as claimed in claim 1 wherein said means for coupling said waveguide sections is a crossed-waveguide directional coupler.

5. A signal conversion device as claimed in claim 1 further including means for sequentially activating said reflection means to cause said signal to be reflected at different ones of said reflection points in sequence.

6. An electrically controllable device for shifting the phase of a microwave signal comprising a directional coupler having an input waveguide section, an output waveguide section, and at least one further waveguide section, said sections being coupled for non-reciprocal signal transmission so that a signal introduced at said input waveguide section is at least partially transmitted to said further waveguide section but is not substantially directly transmitted into said output waveguide section and so that signals from said further waveguide section are at least partially transmitted to said output waveguide section; fixed signal reflection means for substantially reflecting a microwave signal and located in said further waveguide section, and a plurality of electrically controllable signal reflection means for reflecting a microwave signal in said further waveguide section, said electrically controllable signal-reflection means being fixedly spaced from said first signal reflection means, whereby a signal introduced into said input waveguide section enters said further waveguide section and is reflected back and passes out said output waveguide section, and whereby the phase of the output signal may be shifted by selectively activating said controllable reflection means to change the length of the signal path of at least a portion of said signal in said further waveguide section and between said input and output waveguide sections.

7. A device as in claim 6, further comprising means for sequentially and cyclically activating said controllable signal-reflection means to cause a sequential step-wise phase shift of said input signal.

8. A device as claimed in claim 6 wherein the total number of signal reflection means and controllable reflection means being equal to $a$, the spacing between said reflection-means is approximately equal to $$\left(\frac{1}{2a}+\frac{n}{2}\right)$$

wavelengths of the signal to be converted, where $n$ is a positive integer.

9. A device as claimed in claim 8 further including means for sequentially activating said reflection means to produce a continual step-wise phase shift in a signal passing through said device.

10. A frequency converter for shifting the frequency of an alternating electrical input signal comprising two parallel waveguides having a common wall with an aperture therein, said aperture being dimensioned to directionally couple said waveguides, an end wall closing said waveguides at one end, a waveguide arm extending outwardly from each said waveguide at a distance from the closed end of said waveguides approximately equal to 1/6 of a wavelength of said signal to be shifted, a further waveguide arm extending outwardly from each said waveguide at a distance from the closed end of said waveguide approximately equal to 1/3 of a wavelength of said signal to be shifted, and a crystal electrically connected in each of said arms to provide a microwave switching device, each said crystal being mounted at a distance from its main waveguide effectively equal to approximately a multiple of one-half wavelength of the signal to be shifted, whereby a signal introduced into one of said waveguides is reflected and passes out the other of said waveguides, and whereby the phase of the output signal may be shifted by activating one or more of said crystals to change the length of the signal path within said waveguides.

11. An electrically controllable modulator for shifting the phase of a microwave signal comprising a crossed-waveguide type directional coupler, said coupler comprising a first waveguide and a second waveguide perpendicular to and adjoining said first waveguide, said waveguides having a common wall with a pair of staggered apertures therein for directionally coupling said waveguides so that substantially none of the signal introduced at an input end of said first waveguide will be directly fed into an output end of said second waveguide, an attenuator in the other end of said first waveguide opposite said input end, first signal reflection means located along said second waveguide opposite said output end and spaced from said apertures, further electrically controllable microwave signal reflection means located along said second waveguide between said apertures and said first signal reflection means, whereby a signal introduced into the input end of said first waveguide enters said second waveguide and is reflected out the output end of said second waveguide and whereby the phase of the output signal may be shifted by activating said controllable reflection means to change the length of the signal path between said input end of said first waveguide and said output end of said second waveguide.

12. An electrically controllable device for shifting the phase of a microwave signal comprising a directional coupler having an input waveguide section, an output waveguide section, and at least one further waveguide section, said sections being coupled for non-reciprocal signal transmission so that a signal introduced at said input waveguide section is at least partially transmitted to said further waveguide section but is not substantially directly transmitted into said output waveguide section and so that signals from said further waveguide section are at least partially transmitted to said output waveguide section; signal-reflection means for substantially reflecting a microwave signal in said further waveguide section, and a plurality of electrically controllable reflection means for substantially reflecting a microwave signal in said further waveguide section, each said electrically controllable reflection means comprising a crystal mounted in a waveguide section to provide a microwave switching device and means for supplying an electrical signal to activate said crystal, said electrically controllable signal-reflection means being spaced from said first signal-reflection means and from each other, whereby a signal introduced into said input waveguide section enters said further waveguide section and is reflected back and passes out said output waveguide section, and whereby the phase of the output signal may be shifted by selectively activating said controllable reflection means to change the length of the signal path in said further waveguide section and between said input and output waveguide sections.

13. A microwave frequency signal conversion device comprising a wave translation structure having an input waveguide section, an output waveguide section, and at least one further waveguide section, said sections being coupled for non-reciprocal signal transmission so that a signal introduced at said input waveguide section is at least partially transmitted to each said further waveguide section but is not substantially directly transmitted into said output waveguide section, and so that signals from each said further waveguide section are at least partially transmitted to said output waveguide section; first signal-reflection means for reflecting a microwave signal in each said further waveguide section, and a plurality of electrically controllable reflection means for at least partially reflecting a microwave signal, there being at least one such reflection means in each said further waveguide section, each said electrically controllable signal-reflection means being spaced from its corresponding first signal-reflection means, whereby a signal introduced into said input waveguide section enters a further waveguide section and is reflected back and passes out said output waveguide section, and whereby the phase of the output signal may be shifted by activating said controllable reflection means to change the length of the signal path in said further waveguide section and between said input and output waveguide sections.

14. A signal conversion device as claimed in claim 13, further including means for sequentially and cyclically activating said controllable reflection means to cause said signal to be at least partially reflected at different ones of said reflection means in sequence.

References Cited in the file of this patent

UNITED STATES PATENTS

| | | |
|---|---|---|
| 2,380,366 | Nelson | July 10, 1945 |
| 2,479,650 | Tiley | Aug. 23, 1949 |
| 2,602,859 | Moreno | July 8, 1952 |
| 2,666,181 | Courtillot | Jan. 12, 1954 |
| 2,679,631 | Norman | May 25, 1954 |
| 2,683,855 | Blitz | July 13, 1954 |
| 2,728,050 | DeLindt | Dec. 20, 1955 |
| 2,768,356 | DeLindt | Oct. 23, 1956 |
| 2,834,876 | Pritchard | May 13, 1958 |